Feb. 3, 1970

R. E. HAUFF 3,492,889

ADJUSTABLE CONTROL STAND

Filed March 18, 1968

INVENTOR.
ROY E. HAUFF
BY
Tweedale & Gerhardt
ATTORNEYS.

Feb. 3, 1970 R. E. HAUFF 3,492,889
ADJUSTABLE CONTROL STAND
Filed March 18, 1968 2 Sheets-Sheet 2

INVENTOR.
ROY E. HAUFF
BY
Tweedale & Gerhardt
ATTORNEYS.

United States Patent Office 3,492,889
Patented Feb. 3, 1970

3,492,889
ADJUSTABLE CONTROL STAND
Roy E. Hauff, Stow, Ohio, assignor to Massey-Ferguson Inc., Des Moines, Iowa, a corporation of Maryland
Filed Mar. 18, 1968, Ser. No. 713,885
Int. Cl. G05g 1/04, 13/00
U.S. Cl. 74—523                    2 Claims

ABSTRACT OF THE DISCLOSURE

A vehicle control stand mounted adjacent an operator's seat for supporting a plurality of control levers connected with control valves or the like. The levers can be adjusted as a unit relative to the seat to provide optimum accessibility of the control levers to the operator.

---

This invention relates generally to vehicle controls, and is particularly concerned with a mounting for control levers for actuating control elements of a vehicle such as hydraulic valves and the like.

Tractor mounted earthworking machinery such as backhoes and shovel loaders requires the operator, during earthworking operations, to constantly manipulate a bank of valves or similar control elements. Since each machine is frequently operated by different persons, the position of the control lever relative to the operator's seat that is convenient for one operator may be quite different from that which is convenient for another operator.

An object of this invention is to provide a control stand for adjustably supporting the control handles or levers for actuating control elements of vehicle mounted equipment so that the position of the control handles relative to the operator can be selectively changed.

In accordance with the present invention, a support member is mounted adjacent the operator's seat and a yoke member is pivotally mounted on the support. The yoke member includes a shaft spaced from and parallel to the pivotal axis of the yoke, and a purality of control levers are mounted on the shaft for selective rotation about the axis thereof. The yoke member can be locked in a selected one of several angular positions relative to the support member to permit the operator to adjust the control levers into the most convenient position. Control forces are transmitted to the control elements by rotation of the control levers about their shaft.

Other objects, advantages and features of the invention will become apparent from the following description taken in connection with the accompanying drawings in which.

Figure 1:
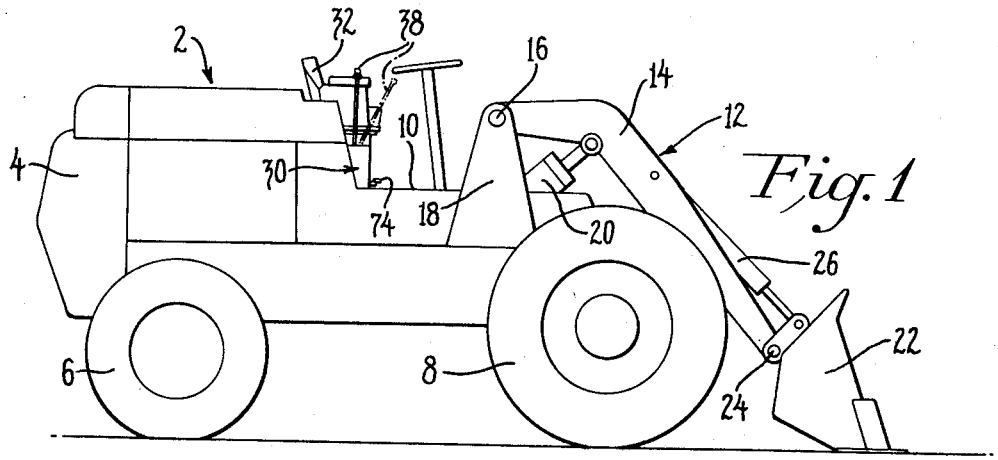
FIG. 1 is an elevational view of a tractor with an excavating implement mounted thereon having a control stand embodying the invention.
Figure 2:
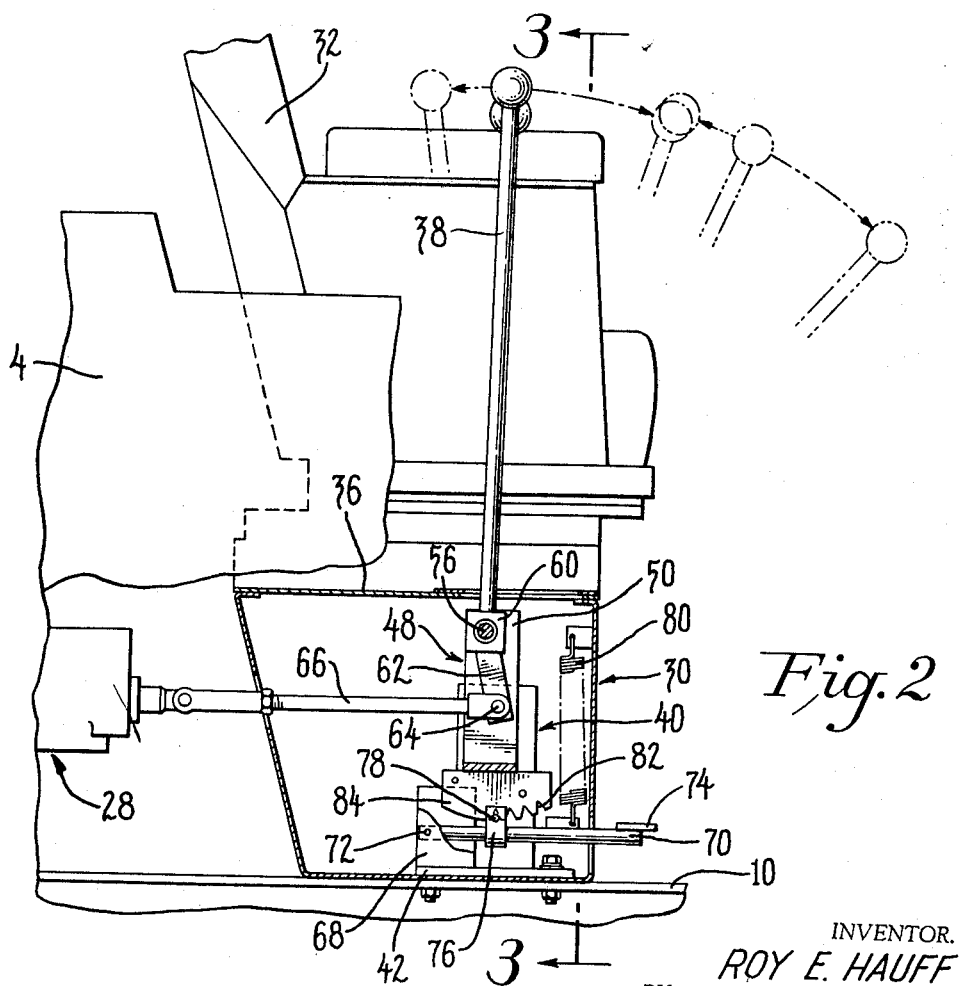
FIG. 2 is an enlarged elevational view, partially in section, of the operator's station of the vehicle of FIG. 1.

In FIG. 1, reference numeral 2 collectively designates a tractor having a main body 4 supported on rear and front wheels 6 and 8, respectively. The main body 4 is formed with an operator's platform or deck 10. An excavating implement collectively designated by reference numeral 12 is mounted on the forward portion of the vehicle. The excavator 12 includes a boom 14 pivotally mounted at 16 on a support 18. Pivotally mounted at 24 on the forward end of the boom is a bucket 22. A hydraulic boom lifting ram 20 is mounted between the boom and main body 4 for raising or lowering the boom about pivot point 16, and a hydraulic bucket tilting ram 26 is mounted between bucket 22 and boom 14 for tilting the bucket about pivot point 24. The flow of hydraulic fluid to and from the rams 20 and 26 is controlled by a bank of valves 28 (FIG. 2).

At the operator's station on platform 10 is mounted a pedestal 30 on which is supported a seat 32 for the operator. Pedestal 30 has a stepped cover 36 and seat 32 is supported on rails on the upper level of the cover portion 36. From the operator's seat 32, the operator drives the vehicle and manipulates the control elements, or valves, 28 through a plurality of control levers 38 mounted adjacent the operator's seat.

Figure 3:
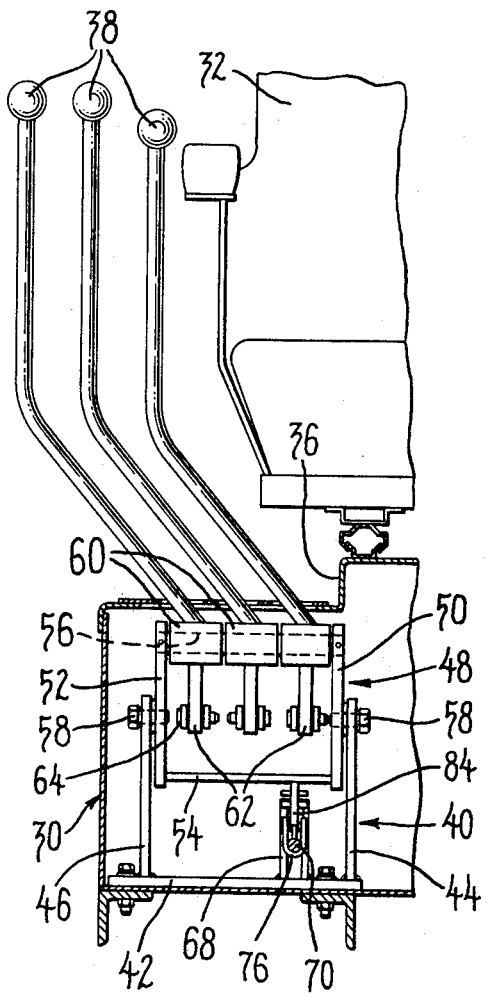
FIG. 3 is a sectional view taken on lines 3—3 of FIG. 2.

Control levers 38 are part of a control stand which includes a support member 40 having a mounting plate 42 with a pair of upright, spaced, parallel support arms 44 and 46 (FIG. 3). A yoke designated generally by reference numeral 48 is mounted on the support member and includes a pair of side frame members 50 and 52 joined together by a cross member 54 adjacent one end of the side frame members. The opposite ends of the side frame members are connected by a shaft 56. The side frame members are pivotally mounted intermediate their ends to the upper ends of support arms 44 and 46 by coaxial pivot bolts 58. The yoke member 48 consisting of shaft 56, cross member 54 and side frame members 50 and 52 is therefore pivotally mounted on the support 40 about the common axis of the pivot bolts 58.

Formed on the lower end of each control lever 38 is an enlarged, apertured lug 60 which in turn is mounted for rotation about the axis of shaft 56. Depending from each lug 60 is an actuating arm 62 which in turn is pivotally connected at 64 with one end of a motion transmitting rod 66, the other end of rod 66 being connected with one of the control valves 28. Rotation of one of the control levers 38 about the axis of shaft 56 causes simultaneous rotation of its associated actuating arm 62 to transmit a controlling movement to the valve 28 to which it is connected. Each pivot pin 64 is located such that it is substantially coaxial with the axis of bolts 58 when the control valves are in their neutral positions. Consequently, yoke member 48 can be rotated relative to support 40 without causing movement of valves 28 from their neutral positions.

Figure 4:
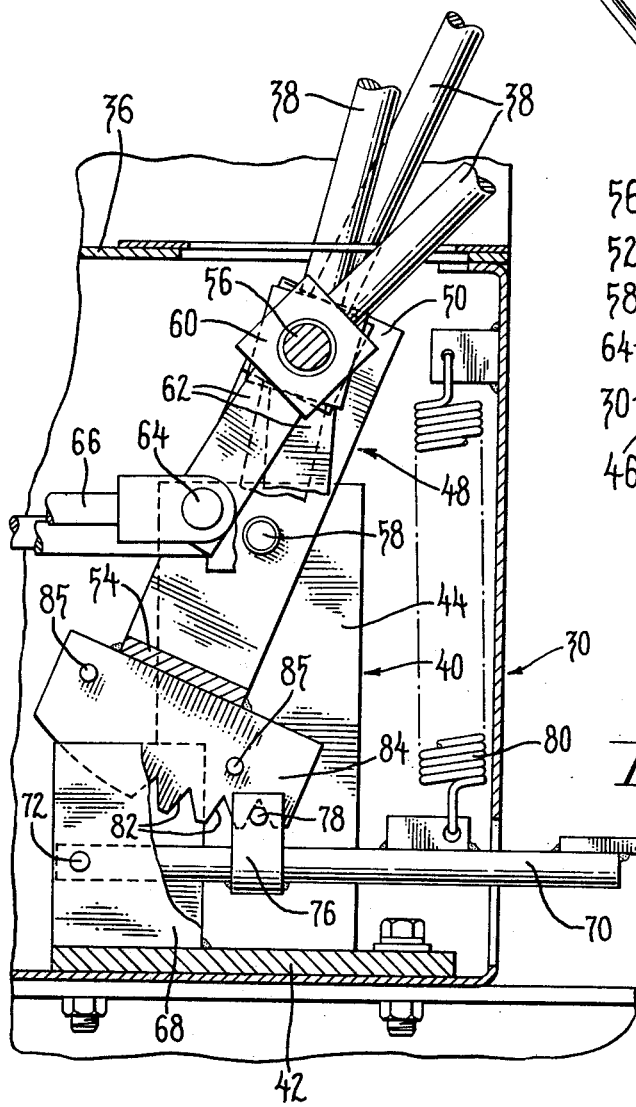
FIG. 4 is an enlarged elevational view of the control stand.

Mounted on plate 42 between arms 44 and 46 is a bracket 68 for pivotally supporting one end of a locking lever 70. Locking lever 70 is pivotally supported on bracket 68 by a pin 72. A foot pedal 74 is mounted on the free end of locking lever 70 which projects through a slot in the front wall of pedestal 30. A U-shaped strap 76 is welded onto lever 70 and supports a locking pin 78 which is engageable with a selected one of a plurality of notches 82 formed in a locking plate 84 welded or otherwise secured to cross member 54. Laterally projecting stop pins 85 (FIG. 4) on plate 84 limit the pivotal movement of yoke member 48 about pins 58 in either direction by engaging bracket 68. Locking lever 70 is biased upwardly by spring 80 to cause the pin 78 to engage one of the notches 82.

In operation, the operator presses on foot pedal 74 to disengage pin 78 from locking plate 84 and permit the control levers 38 and yoke 48 to be pivoted as a unit about the axis of bolts 58 to the position relative to seat 32 most convenient to the operator. When the desired position is reached the foot pedal is released and pin 78 locks the yoke member in position. Further actuation of control levers 38 about shaft 56 actuates the associated valves 28 individually or collectively to operate the hydraulic equipment.

While a specific form of the invention has been illustrated and described in the foregoing specification and accompanying drawings, it should be understood that the invention is not limited to the exact construction shown, but that various alternatives in the construction and arrangement of parts will become apparent to those skilled in the art without departing from the scope and spirit of the invention.

I claim:

1. In material handling apparatus having an operator's station and a plurality of control elements, a control stand mounted adjacent the operator's station for manipulation by the operator to transmit control forces to the control elements comprising: a support member; a bracket on the support member; a yoke pivotally mounted on the support member; a plurality of control levers supported on said yoke for pivotal movement about an axis parallel to the pivotal axis between the yoke and support member; an actuating arm on each of said control levers, means connecting each of said actuating arms with one of the control elements; a locking plate carried by the yoke member and including a series of notches; a locking lever pivotally mounted on the bracket and including a locking pin engageable with a selected one of said notches to lock the yoke against movement relative to the support member, means biasing the locking lever toward engagement with the locking plate; said locking lever being selectively disengageable with the locking plate to permit the yoke to freely pivot on the support member; and a pair of spaced stop pins on said locking plate engageable with the bracket when the yoke is pivoted in opposite directions to limit the pivotal movement of the yoke relative to the support member.

2. The construction claimed in claim 1 wherein said means connecting each of said actuating arms with one of the control elements comprises a motion transmitting rod pivotally connected with the actuating arm, and wherein each of the control elements has a neutral position in which the pivotal connection bewteen the motion transmitting rod and the actuating arm is substantially coaxial with the pivotal connection between the yoke and support member.

References Cited

UNITED STATES PATENTS 3,242,763   3/1966   Buchwald _____ 74—560

MILTON KAUFMAN, Primary Examiner.

U.S. Cl. X.R.

74—491